United States Patent
Jia

(10) Patent No.: US 8,056,090 B2
(45) Date of Patent: Nov. 8, 2011

(54) REDUCING LAYERING OVERHEAD IN COLLECTIVE COMMUNICATION OPERATIONS

(75) Inventor: Bin Jia, West New York, NJ (US)

(73) Assignee: International Business Machines Corporation, Armonk, NY (US)

( * ) Notice: Subject to any disclaimer, the term of this patent is extended or adjusted under 35 U.S.C. 154(b) by 1165 days.

(21) Appl. No.: 11/771,311

(22) Filed: Jun. 29, 2007

(65) Prior Publication Data

US 2009/0007140 A1    Jan. 1, 2009

(51) Int. Cl.
  *G06F 13/00* (2006.01)
  *G06F 9/46* (2006.01)
(52) U.S. Cl. ........ 719/314; 718/100; 718/107; 711/100; 711/118; 711/154
(58) Field of Classification Search .................. None
See application file for complete search history.

(56) References Cited

U.S. PATENT DOCUMENTS

| | | | |
|---|---|---|---|
| 5,390,232 A * | 2/1995 | Freeman et al. | 379/10.01 |
| 6,526,022 B1 * | 2/2003 | Chiu et al. | 370/229 |
| 7,370,317 B2 * | 5/2008 | Cabrera et al. | 717/105 |
| 7,555,607 B2 * | 6/2009 | Collard et al. | 711/125 |

* cited by examiner

*Primary Examiner* — Andy Ho
*Assistant Examiner* — Phuong Hoang
(74) *Attorney, Agent, or Firm* — Matthew W. Baca, Esq.; Kevin P. Radigan, Esq.; Heslin Rothenberg Farley & Mesiti P.C.

(57) ABSTRACT

A communication method for collective operations is provided which eliminates the need for a three layered structure. Instead, the method of the present invention employs a control structure which is specifically designed to keep track of the progress of the collective communication operations and the facilities for the handling of asynchronous message passing. The method of the present invention thus eliminates the need for an intermediary, point-to-point communication layer that is required to follow message matching semantics for sending messages, receiving messages and for awaiting message arrivals. Application layer tasks and user defined programs running in the communication layer share access to the control structure as a mechanism for synchronizing and scheduling the progress of the collective communication operation.

20 Claims, 3 Drawing Sheets

REDUCING LAYERING OVERHEAD IN COLLECTIVE COMMUNICATION OPERATIONS

This invention was made with Government support under Agreement No. NBCH3039004 awarded by DARPA. The Government has certain rights in the invention.

TECHNICAL FIELD

This invention relates in general to collective operations in a multinode data processing system, and more particularly, to collective operations as carried out in multinode data processing systems. More particularly, the present invention is directed to systems and methods which provide a control structure for such operations in a manner in which layering overhead is reduced.

BACKGROUND OF THE INVENTION

In order to provide useful background information to better frame the environment in which the present invention is employed, consideration is given to what is most likely viewed as the paradigm application in which collective operations are performed. Accordingly, attention is directed to the calculation of the largest one of a large set of numbers. The set of numbers is divided up and they are parceled out to a number of independent data processing units each one of which is capable of determining a maximum value for the set of numbers that it has been given (either directly or by the passage of a boundary address for a subset of the whole set of numbers). Clearly, this is the type of operation that can be parceled out again to another set of data processing nodes. The net result is that operations of this sort, referred to as collective operations, are ones that parceled out with data moving down a structured tree of processing elements and with resulting data being passed back up the tree. In the basic example illustrated herein, each node in the tree computes a maximum value for the set that it has been assigned and returns that result to the node from which it received the data, further up the tree (a tree root at top picture being assumed so as to make sense of the use of the word "up"). That node then picks a maximum value from the set of data returned to it and, in turn, passes that result further up the tree. Such is the basic nature and function of so-called collective operations. While this example illustrates the general principles and justifications for the use of collective operations, it should be noted that, in general, the data that is passed up and down the branches of a tree structure is often of a significant size and is not limited to a single number. It is often numeric, however, and often has a specific structure. The present invention is directed to structures and processes which underlie collective operations.

Collective communication operations play a very important role in high performance computing. In collective communication, data are redistributed cooperatively among a group of processes. Sometimes the redistribution is accompanied by various types of computation on the data and it is the results of the computation that are redistributed. The de facto message passing programming model standard, namely the Message Passing Interface (MPI) defines a set of collective communication interfaces, including MPI_BARRIER, MPI_BCAST, MPI_REDUCE, MPI_ALLREDUCE, MPI_ALLGATHER, MPI_ALLTOALL etc. These are application level interfaces and are more generally referred to as APIs. In MPI, collective communications are carried out on communicators which define the participating processes and a unique communication context.

Functionally, each collective communication is equivalent to a sequence of point-to-point communications, for which MPI defines MPI_SEND, MPI_RECEIVE and MPI_WAIT interfaces (and variants). MPI collective communication operations are implemented with a layered approach, that is, the collective communication routines handle semantic requirements and translate the collective communication function call into a sequence of SEND/RECV/WAIT operations according to the algorithms used. The point-to-point communication protocol layer guarantees reliable communication. A communication protocol stack often consists of several layers, each provides certain functionality and service to a higher layer. The MPI point-to-point layer itself is sometimes built on other point-to-point communication layers, some of which are not of the two sided communication model. One such example is the IBM Parallel Environment/MPI and IBM LAPI (a Low-level Application Program Interface set of definitions and functions). The MPI point-to-point communication layer in IBM PE/MPI is called Message Passing Client Interface (MPCI), which is built on top of point-to-point active message functionalities provided by the IBM Low-level Application Programming Interface (LAPI). LAPI consists of interfaces for the source side of the data making transfer requests and handler interfaces for upper layer functionality to be carried out by LAPI on its behalf. There are three types of handlers in LAPI, including send side completion handler, receive side header handler and receive side completion handler. The collective communication operations in IBM PE/MPI interfaces with MPCI, which in turn interfaces with IBM LAPI.

Despite its advantages, the layered approach has performance issues, one of which is the locking overhead in a threaded environment. A lock is required for each layer to protect its internal data structure. Multiple lock/unlock costs are paid when control goes through multiple layers. In the above example, to complete a collective communication operation, the MPI layer of IBM PE/MPI may make multiple calls to the MPCI layer, each one resulting in a LAPI function call and each requiring the following sequence:

MPI processing;
releasing the MPI lock;
acquiring MPCI lock;
MPCI processing;
releasing MPCI lock;
acquiring LAPI lock;
LAPI processing;
releasing LAPI lock;
reacquiring MPCI lock;
MPCI processing;
releasing MPCI lock; and
requiring MPI lock;

Another issue is that the interfaces provided by a two-sided, point-to-point communication lower layer (for example, MPCI) are generic and may not be convenient to serve certain special requirements of a particular upper layer. The MPCI protocol complies to the MPI point-to-point communication semantic which sometimes complicates things more than necessary. One of these cases is transferring a large message involved in collective communication operations. To send a large message in standard mode, MPCI implements the rendezvous protocol in which the sender sends a "message envelop" to the receiver and waits for the receiver's signal on sending the data. This can add substantial overhead and increase implementation complexity. In collective communication, the message envelope is not required to be delivered to the receiver for message matching purpose when "send" is posted before the receive. Message matching semantics enforced by the two sided point-to-point communication interface is not necessary for collective communication operation. Another example is the implementation of MPI_Reduce. MPI_Reduce combines inputs from all participating processes, using a combine operation specified through the interface, and returns the results in a receive buffer of one process (called the root of the reduce operation). The task that performs the reduce operation needs to receive some inputs from other tasks. With the point-to-point send/receive protocol, temporary buffers are allocated and extra copies are used to store those inputs at the MPI layer before carrying on the reduce operation. A third example is a small message MPI_Bcast where the message available at one process (referred to as the root) is transferred to all of the other participating processes. Implementation of MPI_Bcast is often based on tree algorithms in which the message is sent from the root of the tree to internal nodes of the tree and then forwarded along the branches. With the point-to-point send/receive protocol, a node can only receive the message after all nodes along the branches from the root to the node made the bcast call. Delay at any internal node in calling bcast delays the completion of the bcast at the downstream nodes along the branch.

In the process shown in FIG. 1, this is shown using the layered implementation of MPI_Barrier as an example. The algorithm for BARRIER requires log N round of communications by each process (logarithms are assumed to be base 2). During round j, process i sends a 0 byte message to process $((i+2^j) \bmod N)$ and receives a 0 byte message from process $((i+N-2^j) \bmod N)$. A message consists of an envelope and a payload of user data. Messages without user data payloads are referred to as "0 byte messages." These may also be referred to as "control messages" or "zero payload messages." The "send" in a new round cannot start until the receiver of the previous round completes. At MPI level, the algorithm is implemented by a loop of nonblocking mpci_recv and blocking mpci_send calls followed by mpci_wait to make sure the mpci_recv completes. MPCI calls LAPI_Xfer to send messages and loops on calling LAPI_Msgpoll for message completion. MPCI registers the generic header handler, the completion handler and the send completion handler for message matching and other two-sided point-to-point communication semantics.

SUMMARY OF THE INVENTION

The active message style interfaces (for example, LAPI) provides more flexibility to upper layers of the communication protocol (for example, MPI), in comparison with two-sided, point-to-point communication interfaces. To address those issues, the present application describes methods to implement MPI collective communications on top of active message point-to-point communication layer directly, bypassing the MPI, two-sided point-to-point communication layer. Improved collective communication performance is achieved through reduced protocol layering overhead.

The present invention provides a method for message transfer, in a data processing system, between tasks in support of collective operations, as that term is used herein and as described above. The method includes updating state information for the collective operations in a control structure. The updating is carried out by tasks running in an application layer. A message passing request is initiated from one of the tasks directly to a communication layer interface in a communication layer having point-to-point, message passing communication protocol capabilities. The message is delivered to at least one targeted task in the application layer from the communication layer. Execution of at least one user defined routine in the application layer is triggered upon delivery or upon completion of the sending operation and the message is thus handled asynchronously. The state information in the control structure of the targeted task is updated, upon arrival of the message, by a user defined routine. The state information in the control structure of the initiating task is also updated, upon completion of message sending, by a user defined routine.

Additional features and advantages are realized through the techniques of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION

Figure 1:
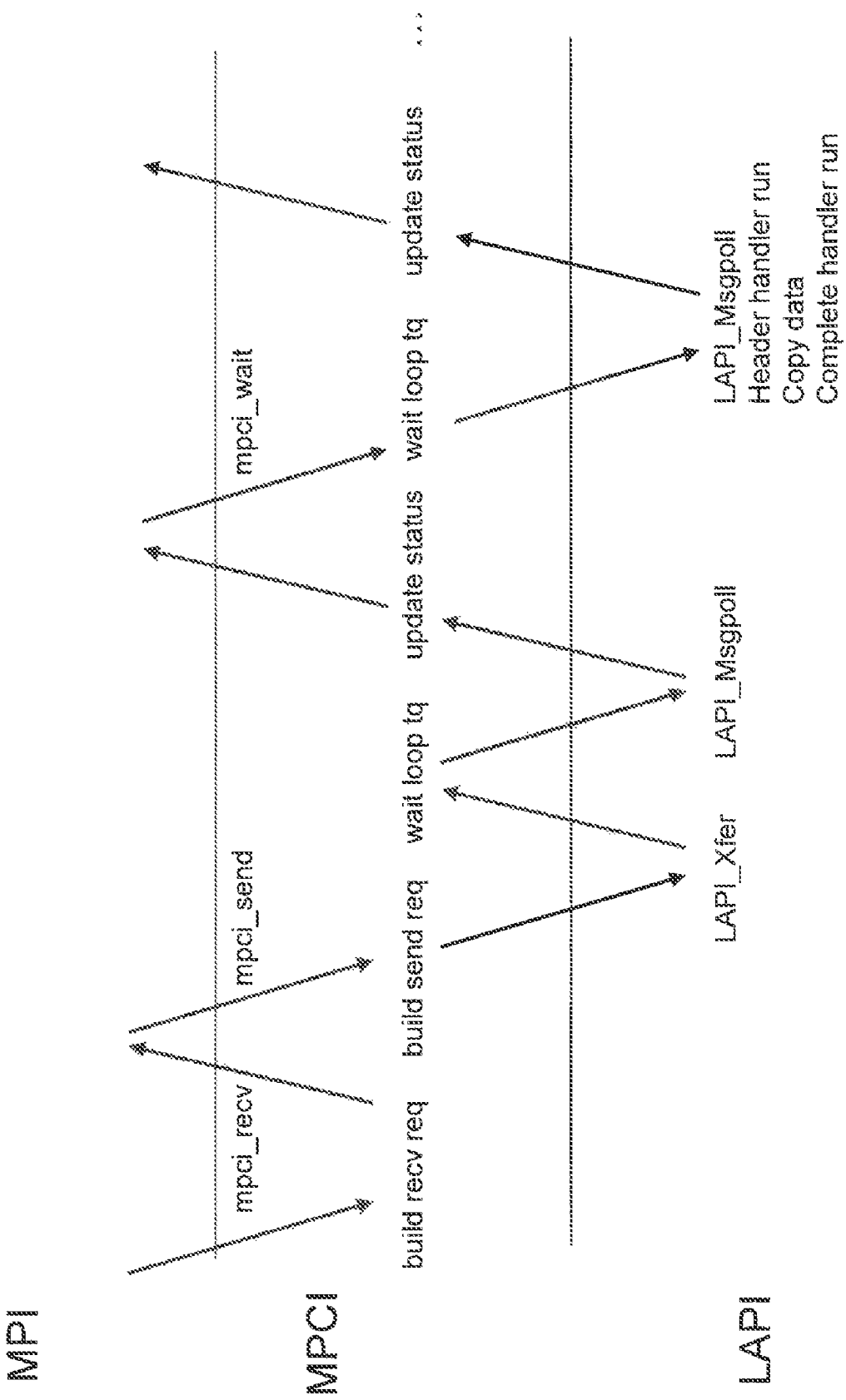
FIG. 1 is a chart indicating various interlayer communication exchanges that occur in the use of collective operations without the use of the present invention.

FIG. 1 illustrates a different approach to the problem of message transfer between tasks. In the approach shown the transfer involves the use of an intermediate layer, the Message Passing Client Interface (MPCI). This approach involves the use of three layers: the MPI, the MPCI and the LAPI layer. As is seen, the approach shown involves multiple interlayer communications and transfers. Not only that, it is seen that the use of multiple layers also involves periods of operation where tasks in the MPCI layer employ wait loops. The method of the present invention eliminates the need for a three layered structure. Instead, the method of the present invention employs a control structure which is specifically designed to eliminate the need for an intermediary communication layer by providing structures and variables which are tailored to the situation in which the communication operation is being invoked as the result of a collective operation.

In order to provide the best description of the present invention, IBM's PE/MPI and IBM LAPI are used as exemplar environment. In the approach provided by the present invention, MPI collective communication routines make LAPI data transfer calls directly whenever a message needs to be sent. The transfers are nonblocking. Receiving data is handled by handlers registered with LAPI. The activations of those handlers are asynchronous. Together, the collective communication routine and the handlers cooperate to carry out the collective communication algorithms. Once the collective routine reaches synchronization point, the routine enters a loop of LAPI message polling function calls to drive asynchronous communication and poll for completion indication. The handlers may advance the algorithms to the next synchronization point. A synchronization point in the algorithm is an operation that has a dependency on the completion of a previous receive operation or the local process's call to the collective communication routine. Completion of one collective communication at a process is defined by no more synchronization points left and all data transfers are complete locally. Collective communication routines and the handlers coordinate through control data structures cached with a MPI communicator object which records current state of the algorithm. The MPI_BARRIER is used again as an example. It is a simpler case since there is no application data being transferred or received.

Figure 2:
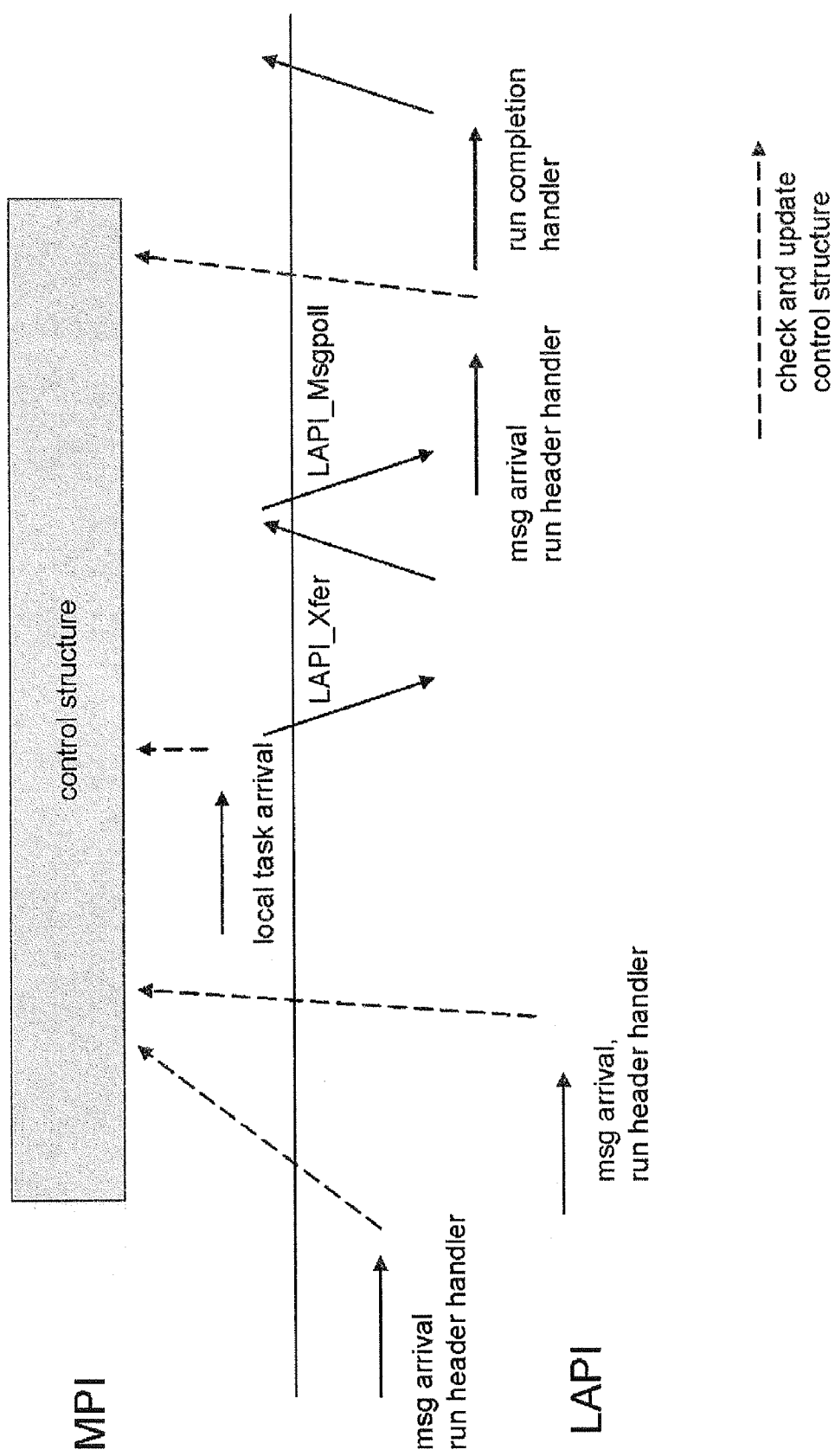
FIG. 2 is a chart indicating improved interlayer communication exchanges that occur in the use of collective operations when using the present invention.

The method of the present invention is exemplified by the layers, transfers and structure shown in FIG. 2. The most significant differences between FIG. 1 and FIG. 2 are that the process illustrated in FIG. 2 only employs two layers and that the method shown in FIG. 2 employs a control structure whose variables are described in detail below. It is also noted that, while the control structure is shown as being present in the MPI layer, it is shared and is also accessible from user defined programs (handlers) running in the LAPI layer. The details of the exchanges shown are provided below.

With the approach employed in the present invention, a LAPI header handler and a completion handler are registered with LAPI during initialization time. The communicator object data structure is augmented to include two bit vectors bitvec_cur and bitvec_next each of size log N where N is the number of processes in the group associated with the communicator. Bitvec_cur is used to track messages from which a process has arrived for the current MPI_BARRIER operation. Bitvec_next is used to track early arrival for the next barrier operation. Initially the bits in both vectors are cleared. There is also integer counter cur_val added to keep track of the synchronization point. In the described MPI_Barrier algorithm, every transfer is a synchronization point. Cur_val is initialized to 0. As used herein, the term "bit vector" refers to an identified region of storage having a specified length in terms of the number of bits present and wherein processing associated with this vector is generally performed on a bit-wise basis, that is, one bit at a time, except perhaps for clearing (resetting) operations.

When the MPI_Barrier routine is called at process i, it first grabs a lock to make sure it has exclusive access to the control structure. A simple lock is sufficient for this purpose since no blocking communication is allowed while holding the lock therefore the length of lock holding is short. More expensive mutex locking is not needed (mutex stands for "mutual exclusion" and refers to a type of lock used to avoid simultaneous access of a shared resource). Next, it copies the value of bitvec_next to bitvec_cur and sets bit 0 of bitvec_cur to "1" (one). All of the bits in bitvec_next are cleared. Then, it scans bitvec_cur to find bit k such that bits 0 through bit k of bitvec_cur are all 1 and the $(k+1)^{st}$ bit of bitvec_cur is 0. Cur_val is set to k. After releasing the lock, the barrier routine calls LAPI_Xfer in a loop to transfer 0 byte messages to processes $((i+2^j) \bmod N)$ where $0 \leq j < k$. If $k \geq \log N$, then there is no synchronization point left; the barrier routine completes; and it returns to the caller. Otherwise, the routine calls LAPI_Msgpoll in a loop until cur_val is greater than log N. Note that the evaluation of cur_val in the loop does not require acquiring the lock again. Also note LAPI guarantees the transfer of messages less than 128 bytes once LAPI_Xfer calls are returned. So in this example, the barrier routines do not have to make further efforts at making sure that all the sends are complete before it returns.

The collective communication sequence number of the current barrier is stored in the header (or envelope) of the "0 byte message," as this phrase is defined above, together with the context number associated with the communicator and distance between the source and the target processes. Here "distance" between two processes is the absolute value of the rank of first process minus the rank of second process. When the header of the message arrives at the target process, LAPI actives the header handler for the BARRIER operation and passes the header to the handler. The handler locates the corresponding communicator object using the context number and the control data structures for the BARRIER operation. It grabs the lock and compares the local collective communication sequence number and the one in the message header. Processing occurs as follows: (1) An error is raised if the former is greater than the latter. (2) If the former is smaller, bit j in bitvec_next is set to 1 where j=log (distance), and the header handler returns after releasing the lock. No completion handler is necessary in this situation. (3) If the two are equal, bit j in bitvec_cur is set to 1. Next the header handler checks if j equals cur_val. If that is the case, the current synchronization point is satisfied by its activation and the header handler scans bitvec_cur to find the next right most 0 bit and updates cur_val accordingly. It then sets up the completion handler and passes both the old and new values of cur_val, s and t, to the completion handler. The header handler returns after releasing the lock. If j is not equal to cur_val, no completion handler is needed. The header handler simply returns after releasing the lock. If the completion handler gets activated for BARRIER operation, it calls LAPI_Xfer in a loop to send messages to processes $((i+2^j) \bmod N)$ where i is the local process and $s \leq j < t$. No locking is required in this circumstance.

Figure 3:
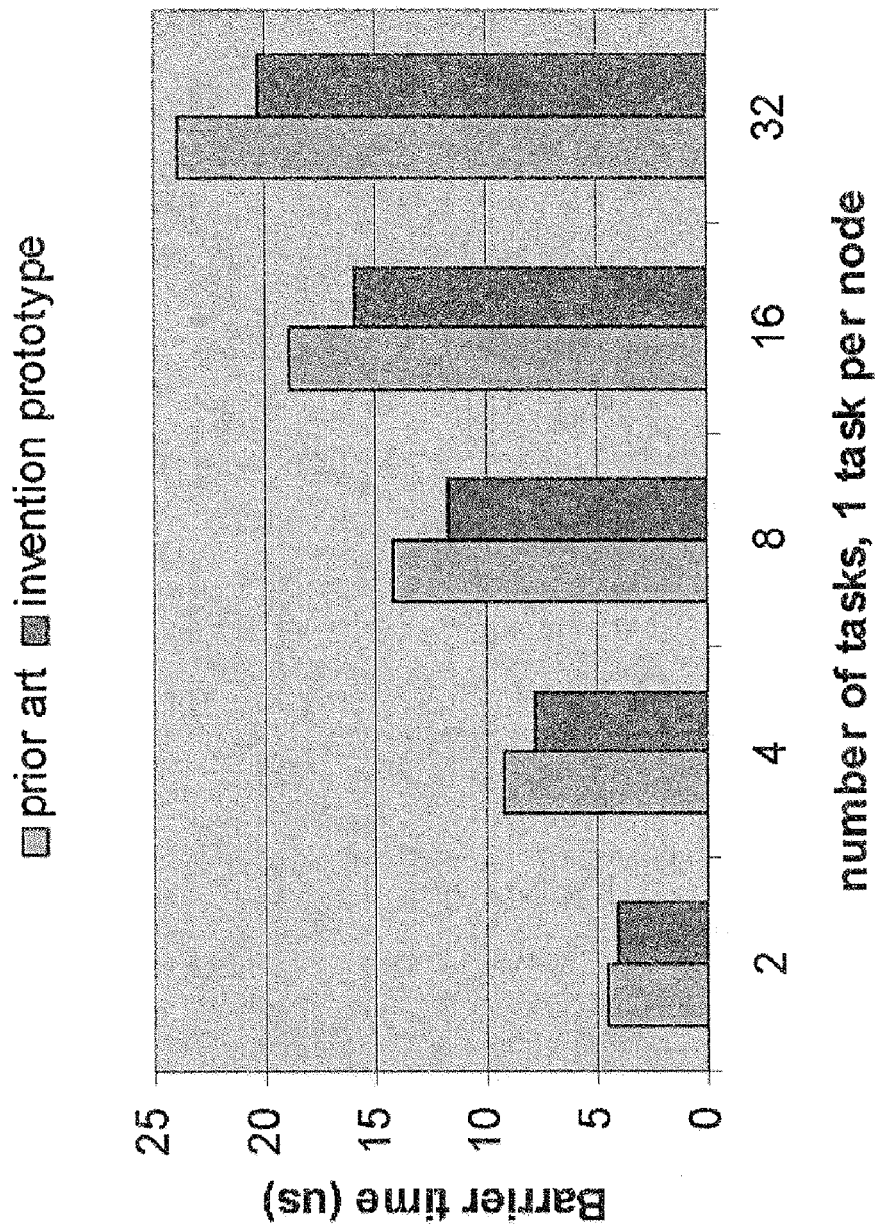
FIG. 3 is a chart indicating the performance improvement achieved by the present invention for various numbers of tasks, with there being an improvement in each case.

The chart shown in FIG. 3 illustrates the performance results from MPI_Barrier benchmark tests with both the approach shown in FIG. 1 and the new approach on a cluster consisting of 32 IBM System P nodes running AIX (as the operating system). The new approach clearly improves MPI_Barrier performance. The function flow of the approach for other collective communication operations is similar. The synchronization points may be different but the idea is same and those skilled in the message passing arts can easily modify the above example to fit in those operations. The chart in FIG. 3 shows five different situations based upon differing numbers of tasks. In each case (2 tasks, 4, tasks, 8 tasks, 16 tasks and 32 tasks) it is seen that the method of the present invention results in a significant reduction in barrier time. It is additionally noted that the improvement in barrier time reduction increases with the number of tasks.

There are, however, added complexities in the present approach for other collective communication operations which allow users to specify how much data needs to be processed and redistributed during collective communication. The extra logic is employed in the following three situations:

First: When the data length in a message is greater than 128 bytes, return from LAPI_Xfer does not guarantee completion of sending the message. To address this, similar calls to LAPI_Xfer for other collective communication also specify LAPI send completion handlers. The responsibility of the send completion handler is to increment an integer counter, send_complete, in the control data structure. Once the collective communication routine finds cur_val is greater than the number of synchronization points, it continues the polling loop instead of breaking out until the value of send_complete equals the number of LAPI_Xfer calls being posted.

Second: The header handlers should return a data buffer so that LAPI can move the incoming data to the buffer. It is possible that, when a header handler gets activated, the collective communication routine has not yet been called by the local process. For messages smaller than a certain threshold, the data is cached in early arrival buffers maintained by the MPI library. Flow control based on tokens is the method used for managing the early arrival buffers. The token flow control is easily incorporated in the present approach. If the message is smaller than certain threshold and there is token available, the source simply calls LAPI_Xfer. When the message arrives earlier than the target process calling the corresponding collective communication routine, the header handler moves the data into the early arrival buffer and stashes the address of the earlier arrival buffer in the control data structure. When the collective communication routine is called, the early arrived data is consumed as part of the synchronization advancing process. If tokens are used up at the sender process, LAPI_Xfer is called to send a "0 byte message" with the data address at the source process recorded in the header. No send completion hander is scheduled for this LAPI_Xfer. When this control message arrives at the target process, the header handler stores this information in the control data structure if it is an early arrival with a flag indicating the data is still at the source process. Once the synchronization point advance gets to this message, a reply control message is sent back to the source of the data, which triggers the data actually being transferred by another LAPI_Xfer. The send completion hander is scheduled for this transfer.

Third: When the data length is greater than the threshold, the message is treated as smaller message without a token. The present invention uses a simpler and more efficient solution in which the source process records the data address in the control data structure and skips calling LAPI_Xfer. On the target side, if a message with large application data needs to be received, LAPI_Xfer is called to send a 0 byte message to the source process with the receive buffer address in the header. The control message triggers the data being actually transferred to the target.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for message transfer, in a data processing system, between tasks in support of a collective operation, said method comprising:
   responsive to invoking at least one collective operation by tasks executing in an application layer, updating, by the tasks executing in the application layer, state information for said at least one collective operation in a control structure accessible to said tasks executing in the application layer, wherein the at least one collective operation comprises processing parceled out cooperatively among the tasks, and wherein the updating comprises:
      initiating, by an initiating task of the tasks executing, on a processor, in the application layer, a message passing request directly to a communication layer interface in a communication layer, the communication layer having a point-to-point, message passing communication protocol, the message passing request for passing at least one message to at least one targeted task of the tasks executing in the application layer;
      delivering, by said communication layer interface, said at least one message to said at least one targeted task executing in said application layer;
      triggering, in said application layer, execution of at least one user defined routine upon said delivering, or upon completion of sending, said at least one message, said execution triggered to asynchronously handle said at least one message;
      updating, by said at least one user defined routine, state information of said at least one targeted task for said at least one collective communication in said control structure upon arrival of said at least one message; and
      further updating, by said at least one user defined routine, state information of the initiating task for said at least one collective communication in said control structure upon completion of sending said at least one message.

2. The method of claim 1 in which said application layer is Message Passing Interface, and wherein the message passing request is initiated directly to the communication layer interface in the communication layer absent passage of the message passing request through an intermediary layer between the Message Passing Interface and the communication layer.

3. The method of claim 1 in which said communication layer is Low-level Application Programming Interface.

4. The method of claim 1 in which said control structure includes two bit vectors for tracking progress of the at least one collective operation, the two bit vectors being updated by the at least one user defined routine as part of the updating the state information of the at least one targeted task in said control structure and the updating the state information of the initiating task in said control structure.

5. The method of claim 4 in which a first one of said two bit vectors is used to track messages from which a task has arrived for a current barrier operation of the at least one collective operation.

6. The method of claim 4 in which a second one of said two bit vectors is used to track early arrival for a next barrier operation of the at least one collective operation.

7. The method of claim 4 in which each one of said two bit vectors is approximately $\log_2 N$ in length, as measured in bits, where N is the number of tasks involved.

8. The method of claim 4 in which said two bit vectors are cleared as part of said initiating.

9. The method of claim 1 in which said control structure includes an integer counter used to keep track of synchronization points.

10. The method of claim 1 in which said at least one user defined routine is registered with the communication layer to be executed asynchronously so as to further the progress of said at least one collective operation.

11. The method of claim 1 in which, for messages of said at least one message smaller than a threshold message size, data is cached in early arrival buffers maintained by the application layer.

12. The method of claim 11 in which said early arrival buffers are managed using tokens.

13. The method of claim 11 in which, upon message arrival earlier than the targeted task, an address of an early arrival buffer is stored in the control structure.

14. The method of claim 13 in which, said early arrived data is consumed as part of synchronization advancement.

15. The method of claim 1 in which, for a message of said at least one message greater than a threshold message size, the message is processed as a smaller message without a token.

16. The method of claim 15 in which a data address is stored in the control structure.

17. The method of claim 16 in which a control message triggers data transfer to a target.

18. The method of claim 1 wherein said application layer is Message Passing Interface, and wherein said communication layer is Low-level Application Programming Interface.

19. A computer system for message transfer between tasks in support of a collective operation, said computer system comprising:
 a memory; and
 a processor in communications with the memory, wherein the computer system is configured to perform:
  responsive to invoking at least one collective operation by tasks executing in an application layer, updating, by the tasks executing in the application layer, state information for said at least one collective operation in a control structure accessible to said tasks executing in the application layer, wherein the at least one collective operation comprises processing parceled out cooperatively among the tasks, and wherein the updating comprises:
   initiating, by an initiating task of the tasks executing in the application layer, a message passing request directly to a communication layer interface in a communication layer, the communication layer having a point-to-point, message passing communication protocol, the message passing request for passing at least one message to at least one targeted task of the tasks executing in the application layer;
   delivering, by said communication layer interface, said at least one message to said at least one targeted task executing in said application layer;
   triggering, in said application layer, execution of at least one user defined routine upon said delivering, or upon completion of sending, said at least one message, said execution triggered to asynchronously handle said at least one message;
   updating, by said at least one user defined routine, state information of said at least one targeted task for said at least one collective communication in said control structure upon arrival of said at least one message; and
   further updating, by said at least one user defined routine, state information of the initiating task for said at least one collective communication in said control structure upon completion of sending said at least one message.

20. The computer system of claim 19, wherein said application layer is Message Passing Interface, and wherein said communication layer is Low-level Application Programming Interface.

* * * * *